Sept. 29, 1942.   G. HEIM   2,297,473
WELDING APPLIANCE
Original Filed March 14, 1938   2 Sheets-Sheet 1
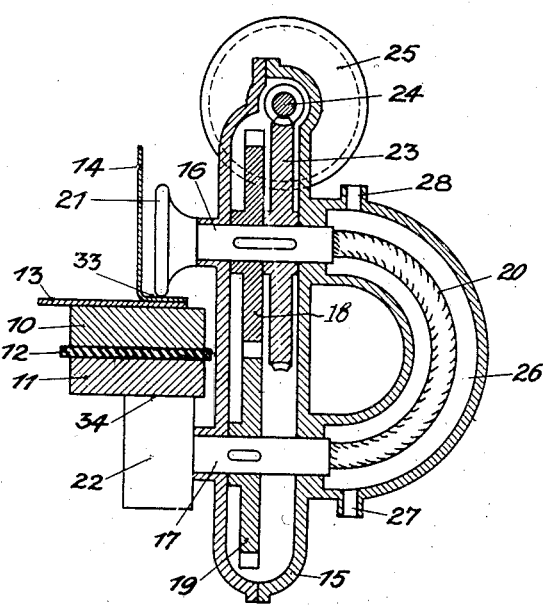
Fig.1.
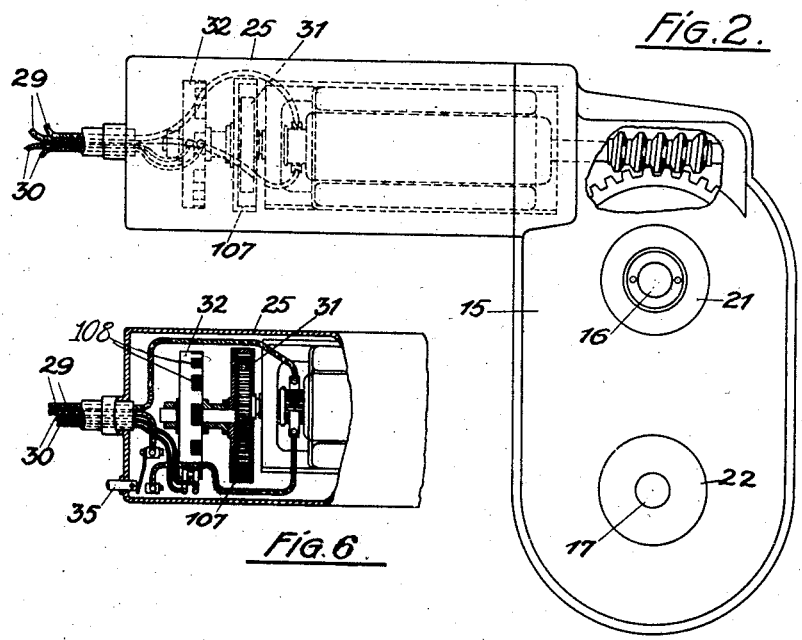
Fig.2.
Fig.6.
INVENTOR:
Gerhard Heim Sept. 29, 1942.                G. HEIM                2,297,473
                          WELDING APPLIANCE
            Original Filed March 14, 1938    2 Sheets-Sheet 2

INVENTOR
GERHARD HEIM
BY
ATTORNEYS

Patented Sept. 29, 1942

2,297,473

UNITED STATES PATENT OFFICE 2,297,473

WELDING APPLIANCE

Gerhard Heim, Sindelfingen, near Stuttgart, Germany; vested in the Alien Property Custodian Original application March 14, 1938, Serial No. 195,804, now Patent No. 2,263,038, dated November 18, 1941. Divided and this application August 17, 1940, Serial No. 353,091. In Germany March 15, 1937

15 Claims. (Cl. 219—4)

This invention relates to improvements in welding appliances, and more particularly to such of the hand-operated type adapted for use in connection with a work-supporting electrode. The instant application is a division of my copending application Serial No. 195,804, filed March 14, 1938.

An object of this invention is to provide a welding appliance which may be simply, quickly and easily operated.

Another object of this invention is to provide a welding appliance which will readily produce a series of welding points in quick succession and with uniform spacing.

Still another object of this invention is the provision of a welding appliance having an electrode roller and a bearing roller so spaced as to properly grip between them the work-supporting electrode and the work to be welded.

A further object of this invention is to provide a welding appliance having an electrode roller and a bearing roller so related that wearing and grinding of this electrode roller will have no effect upon the motion and action of the bearing roller.

A still further object of this invention is to provide a welding appliance by means of which a constant and uniformly good contact will be maintained between the welding roller and the work to be welded despite variation in the angular position of the appliance.

Other objects will become apparent from the following description taken in connection with the attached drawings showing several illustrative embodiments of the invention, and wherein:

Fig. 1 is a vertical cross-section through one form of welding appliance in accordance with this invention, illustrated in a position of use with the work to be welded;

Fig. 2 is a side elevation partially cut away, of the welding appliance illustrated in Fig. 1;

Fig. 6 is a detailed view, partially in cross-section showing the commutating circuits and apparatus for the motor and welding current.

Figure 5:
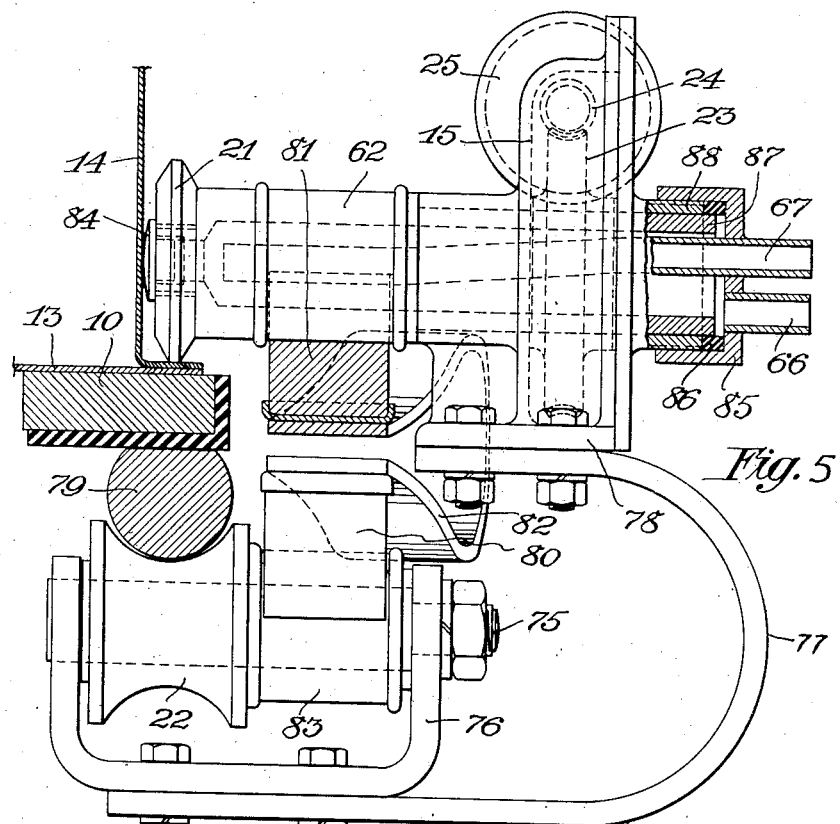
Fig. 5 is a vertical partial cross-sectional view of still another form of welding appliance formed in accordance with this invention.

In the form of invention illustrated in Figs. 1 and 2, there are provided a pair of relatively stationary electrodes 10 and 11, superposed upon one another and separated by a layer of insulation 12. The upper electrode 10 is adapted to support the work to be welded, here illustrated as a pair of sheet metal members 13 and 14. Power is adapted to be supplied to the electrodes 10 and 11 from the secondary side of a welding transformer, not shown, in a manner known to those skilled in this art. The work to be welded, such as the sheet metal members 13 and 14 are adapted to be firmly secured to the electrode 10 by suitable clamping devices, also not illustrated but which are well known. The housing 15 of the welding appliance rotatably supports spaced shafts 16 and 17 which are positively coupled together by the gear wheels 18 and 19, respectively fixedly mounted upon them, and at the same time the shafts are electrically interconnected by means such as a flexible cable 20. At the outer end of the shaft 16 is fixedly mounted the welding roller 21, in contact with the work to be welded, while the outer end of the shaft 17 fixedly supports the bearing roller 22, in contact with the electrode 11. The electrodes 21 and 22 are driven through a gear wheel 23, fixedly attached to the shaft 16, and a worm 24 by a motor, generally indicated at 25. Preferably the flexible cable 20 interconnecting the shafts 16 and 17 is mounted within a spaced tubular housing 26 to which cooling water may be supplied through the opening 27 by means of a suitable hose (not shown). The opening 28 permits escape of the water through another hose which may be connected at this point.

As more particularly illustrated in Figs. 2 and 6, power is adapted to be supplied to the motor 25 through the flexible cable 29 extending through an opening in the motor housing. With the cables 29 there may also be provided a pair of conductors 30, illustrated as contained in a common sheath with the cables 29, which lie in the control circuit for the welding current. Through the gearing 31, 107 a commutating device 32 is driven by the motor 25. This comutating device is interposed in the circuit of the conductors 30 and is so designed that through these conductors the welding current circuit is closed during a certain period of time in each rotation of the motor 25, but is kept open during the remaining time.

The connection of the two objects 13 and 14 by spot-welding is effected by placing the welding appliance in the position illustrated in Fig. 1, and then camming it somewhat in a vertical plane by raising or lowering the motor 25 which serves as a handle. In this manner both the welding roller 21 and also the bearing roller 22 are firmly pressed against the respective running surfaces 33 and 34.

The motor 25 is now set into motion by closure of the switch 35, so that the rollers 21, 22 driven from the motor through the worm gearing 23, 24 and the pair of gear wheels 18, 19 roll upon their running surfaces 33, 34 and thereby drive the appliance slowly and uniformly along the edges to be welded. During the travel the welding current circuit is closed by the commutating device 32 at equal intervals of time and distance, and on each occasion for a comparatively short period of time. This period of time is on the one hand so measured that it is sufficient for sending a current impulse of sufficient welding power through the edges of the objects 13, 14 to be united. On the other hand, however, the time period is so short that the welding point produced, in spite of the advance of the welding roller 21, has no greater expanse than that of an ordinary spot-weld. The welding current will follow a path from one of the energized conductors 11 through the bearing roller, the shaft 17, the cable 20, the shaft 16, the welding roller 21, and through the work pieces 13, 14 to the other energized conductor 10.

Figures 3, 4:
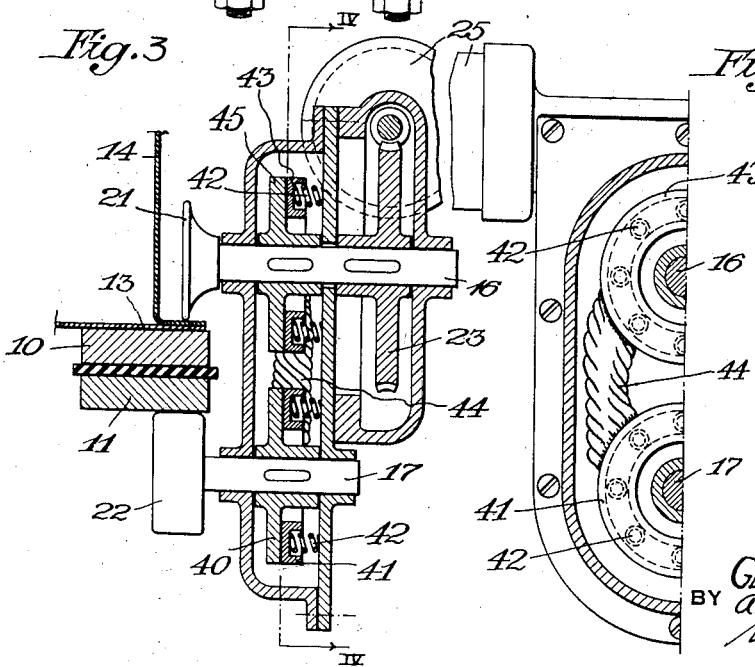
Fig. 3 is a vertical cross-sectional view of a modified form of welding appliance, shown in its position of use with the work to be welded.
Fig. 4 is a fragmentary cross-sectional view of the welding appliance illustrated in Fig. 3, taken along the line IV—IV.

In the form of invention illustrated in Figs. 3 and 4, parts corresponding to those in Figs. 1 and 2, have been given the same reference numerals. In this modified form of construction, only the welding roller 21 is positively driven from the motor 25 through the worm gearing 23 and 24, the bearing roller 22 being simply a trailing roller. This form of invention also includes a different means for leading the current between these two rollers. The current from the bearing roller 22 passes in this case through the shaft 17 to a rotary conductor disc 40, fixed in any suitable manner to the shaft. A stationary conductor ring 41 is then pressed against the face of the disc 40 by suitable means such as spring 42. Another stationary conductor ring 43 is electrically interconnected with the stationary disc 41 by means of a heavy conductor 44, and the ring 43 is then pressed against a rotary disc 45 on the welding roller shaft 16 by other springs 42. In the form of invention illustrated in Figs. 3 and 4, the path of the welding current may accordingly be traced from the energized conductor bar 11, the bearing roller 22, shaft 17, the rotary conductor disc 40, the stationary conductor ring 41, conductor 44, stationary conductor ring 43, rotary conductor disc 45, shaft 16, welding roller 21 and through the work pieces 14 and 13 to the other energized conductor bar 10. Suitable means within the purview of those skilled in this art may also be applied for the cooling of conductor 44, if necessary. Since there is no positive coupling between the welding roller and the bearing roller in the form of invention illustrated in Figs. 3 and 4, changes in the diameter of the welding roller 21 due to wear and grinding will have no influence upon the motion of the bearing roller 22.

Fig. 5 illustrates a third form of the present invention. In this case the welding roller 21 is supported upon a hollow shaft 62 suitably journaled in the housing 15 and driven through the worm gearing 23, 24 by the motor 25. This shaft may be suitably interiorly cooled by means of a long tube extending therein and discharging near the welding roller 21, and supplied with cooling water from a suitable source. The spigot 66 provides an exit for the cooling water, which may then be led away as desired. The tube 67 and spigot 66 may be mounted within a screw cap 85 threadably attached to the open end of the hollow shaft 62. A packing ring 86 is adapted to be pressed by the cap 85 against the outer shaft end 87 and against the end of a shaft bearing 88, in order to prevent penetration of the cooling water into this bearing.

In the form of invention illustrated in Fig. 5, the lower conductor bar is formed with a cylindrical bearing surface, and the bearing roller 22 is suitably profiled for contact with the cylindrical bar. Through this arrangement a good guidance of the welding appliance along the edge of the object to be welded is achieved, and maintenance of a constantly uniformly good contact is insured, even if the appliance is in an inclined position. The axle 75 upon which the bearing roller 22 freely revolves, is preferably fixedly secured in a U-shaped yoke 76 carried by a strong resiliently sprung yoke 77 attached to a base plate 78 on the housing 15. This resilient load yoke possesses, in the work position of the appliance, such a springing force that it forces the bearing roller 22 and the welding roller 21 to grip the work between them with the necessary welding pressure. Minor differences in the distance between the axes of the two rollers 21 and 22 have no appreciable influence upon the value of this pressure.

The current transfer between the bearing roller 22 and the welding roller 21 may be effected by two strong sliding contacts 80 and 81, which are arranged so as to be readily displaceable and which are pressed apart by a yoke-shaped conductor 82. Thus, the contact 80 is constantly pressed down upon an extension 83 of the bearing roller 22, while the contact 81 is pressed against the hollow shaft 62. In order to prevent the end surface on the welding roller 21 from possibly coming into contact with the work operated upon, such as the work piece 14, and thereby short circuit the welding surface, a mushroom-shaped plug of insulating material is threaded in the end of the hollow shaft 62.

While the form of motor and commutator control illustrated in Figs. 2 and 6 has been particularly described in connection with the form of invention illustrated in Fig. 1, it is to be understood that this is equally well adaptable for use with the forms of invention illustrated in Figs. 3, 4 and 5.

While I have herein shown and described only certain embodiments of certain features of my present invention, it is to be understood that they are to be regarded merely as illustrative, and that I do not intend to limit myself thereto except as may be required by the following claims.

I claim:

1. Welding appliance comprising laterally disposed electrode and bearing rollers spaced apart for gripping between them the work and a composite work-supporting electrode, gearing between said rollers, a motor in driving connection with one of said rollers, and a conductive connection between said rollers.

2. Welding appliance comprising laterally disposed electrode and bearing rollers spaced apart for gripping between them work and a work-supporting electrode, a motor in driving connection with said electrode roller, and an electrical connection between said rollers comprising slip rings and a cable.

3. A portable welding appliance adapted for producing a series of spot welds and for travelling along a conductor bar serving as a work-supporting electrode, said device comprising an electrode roller, a motor in driving connection therewith, a contact ring on said roller, a spring pressed slip ring in engagement with said contact ring, and a supply cable connection for said slip ring.

4. In a welding appliance adapted for producing a series of spot welds, an electrode roller with hollow shaft mounting, a bearing housing for said mounting, a motor on said housing in driving connection with said roller, a bearing roller, a bracket mounting therefor, a resilient yoke suspending said bracket mounting from said housing, brush contacts engaging respective roller parts and a resilient yoke constantly tending to tighten said brush contacts.

5. In a welding appliance adapted for producing a series of spot welds, an electrode roller with hollow shaft mounting, a bearing housing for said mounting, a motor on said housing in driving connection with said roller, a bearing roller resiliently supported from said housing, resiliently operated brush contacts electrically connecting between said rollers, and cooling-water circuit connections for said hollow shaft mounting.

6. A welding appliance comprising, in combination, a pair of spaced apart laterally extending rollers formed of current conducting material, a shaft for each roller, a flexible current conducting cable having one end attached to and rotatable with one shaft and the other end attached to and rotatable with the other shaft, and a motor drivably connected to one of said shafts.

7. The combination according to claim 1, in which said appliance is formed with a hollow tubular cooling housing spaced from and surrounding said conductive connection.

8. The combination according to claim 4, in which said resilient yoke comprises a spring tending to press said rollers toward one another.

9. Welding apparatus comprising, in combination, a pair of juxtaposed conductors having insulation therebetween, one of said conductors serving as a work-supporting medium, a portable movable device having a pair of spaced apart rollers, one of said rollers being positioned in contact with one of said conductors and the other in contact with the work to be welded, means for supplying welding current to said conductors, means interconnecting said rollers to complete the welding circuit through the work piece, and a motor mounted on said device and drivably connected to one of said rollers.

10. Welding apparatus comprising, in combination, a pair of juxtaposed conductors having insulations therebetween, one of said conductors serving as a work-supporting medium, a portable movable device having a pair of spaced apart rollers, one of said rollers being positioned in contact with one of said conductors and the other in contact with the work to be welded, means for supplying welding current to said conductors, means interconnecting said rollers to complete the circuit through the work piece, a drive shaft for one of said rollers, a motor mounted on said device, and a worm drive between said motor and said shaft.

11. Welding apparatus comprising, in combination, a pair of juxtaposed conductors having insulations therebetween, one of said conductors serving as a work-supporting medium, a movable device having a pair of spaced apart rollers, one of said rollers being positioned in contact with one of said conductors and the other in contact with the work to be welded, means for supplying welding current to said conductors, means interconnecting said rollers to complete the welding circuit through the work piece, a motor mounted on said device and drivably connected to one of said rollers, and means driven by said motor for periodically interrupting said current supply.

12. Welding apparatus comprising, in combination, a pair of juxtaposed conductors having insulation therebetween, one of said conductors serving as a work-supporting medium, a movable device having a pair of spaced apart rollers, one of said rollers being positioned in contact with one of said conductors and the other in contact with the work to be welded, means for supplying welding current to said conductors, means interconnecting said rollers to complete the welding circuit through the work piece, a motor mounted on said device and drivably connected to one of said rollers, and means for driving the other roller from the one roller.

13. Welding apparatus comprising a composite work-supporting electrode consisting of a flat conductor bar superposed upon a profiled conductor bar with a relatively thin layer of insulation between, said profiled conductor bar being provided with a round guiding surface, and a welding appliance comprising laterally disposed electrode and bearing rollers spaced apart for gripping between them the work and work-supporting electrode, said bearing roller being profiled with a concave contacting surface engaging the round guiding surface of said profiled conductor bar, whereby contacting said profiled conductor bar and said bearing roller is maintained despite changes in the angular position of said welding appliance.

14. A portable welding appliance adapted for producing a series of spot welds and for travelling along a current-conductive work support, said device comprising an electrode roller adapted to engage the work to be welded, a motor in driving connection with said electrode roller, a current-conductive counter-roller adapted to engage said support, a contact ring rotatable with each roller, a relatively stationary spring-pressed slip ring in engagement with each contact ring, and a conductive cable interconnecting said contact rings.

15. The combination according to claim 6, in which said appliance is formed with a hollow tubular housing spaced from and surrounding said conducting table, and connecting means adapted to supply cooling fluid to said hollow tubular housing, whereby said housing serves to both guide said cable and cool the same.

GERHARD HEIM.